(12) United States Patent
Walterick, Jr. et al.

(10) Patent No.: US 10,160,673 B2
(45) Date of Patent: Dec. 25, 2018

(54) METHOD FOR FLOCCULATING ALGAE USING POLYMERS INCLUDING TANNIN

(71) Applicant: General Electric Company, Schenectady, NY (US)

(72) Inventors: Gerald Cecil Walterick, Jr., Leavitown, PA (US); David Brandon Whitt, Long Beach, CA (US); John Gerard Juchcinski, Fairfield, CA (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 14/347,654

(22) PCT Filed: Sep. 28, 2012

(86) PCT No.: PCT/US2012/057889
§ 371 (c)(1),
(2) Date: Mar. 27, 2014

(87) PCT Pub. No.: WO2013/049553
PCT Pub. Date: Apr. 4, 2013

(65) Prior Publication Data
US 2015/0166376 A1    Jun. 18, 2015

Related U.S. Application Data

(60) Provisional application No. 61/540,278, filed on Sep. 28, 2011.

(51) Int. Cl.
| | | |
|---|---|---|
| *C02F 1/56* | (2006.01) | |
| *B01D 21/01* | (2006.01) | |
| *B03D 3/00* | (2006.01) | |
| *C02F 1/52* | (2006.01) | |
| *C02F 103/26* | (2006.01) | |
| *C02F 101/30* | (2006.01) | |
| *B01J 20/26* | (2006.01) | |
| *B01J 20/24* | (2006.01) | |
| *C02F 1/00* | (2006.01) | |

(52) U.S. Cl.
CPC .............. *C02F 1/56* (2013.01); *B01D 21/01* (2013.01); *B03D 3/00* (2013.01); *C02F 1/5263* (2013.01); *B01J 20/24* (2013.01); *B01J 20/262* (2013.01); *C02F 2001/007* (2013.01); *C02F 2101/30* (2013.01); *C02F 2103/26* (2013.01); *Y02E 50/10* (2013.01)

(58) Field of Classification Search
None
See application file for complete search history.

(56) References Cited

U.S. PATENT DOCUMENTS

| | | | |
|---|---|---|---|
| 5,643,462 A | 7/1997 | Chen et al. | |
| 5,684,109 A * | 11/1997 | Chen | C02F 1/54 |
| | | | 524/72 |
| 5,785,862 A * | 7/1998 | Graham | C01G 49/14 |
| | | | 210/723 |
| 5,846,436 A | 12/1998 | Chen et al. | |
| 5,916,991 A | 6/1999 | Chen et al. | |
| 7,438,817 B2 | 10/2008 | Nagghappan et al. | |
| 2002/0079270 A1 | 6/2002 | Borodyanski et al. | |
| 2008/0149569 A1* | 6/2008 | Rai | C02F 1/547 |
| | | | 210/728 |
| 2009/0065435 A1 | 3/2009 | Li et al. | |
| 2009/0259082 A1* | 10/2009 | Deluga | C10G 1/002 |
| | | | 585/14 |
| 2010/0077654 A1* | 4/2010 | Wu | B01D 11/0288 |
| | | | 44/385 |
| 2010/0233761 A1* | 9/2010 | Czartoski | C12N 1/06 |
| | | | 435/71.1 |
| 2011/0062377 A1 | 3/2011 | Haase | |
| 2011/0086386 A1* | 4/2011 | Czartoski | C12N 1/06 |
| | | | 435/67 |
| 2012/0036767 A1 | 2/2012 | Larach | |

FOREIGN PATENT DOCUMENTS

| | | | |
|---|---|---|---|
| CN | 101602533 A | * | 12/2009 |
| CN | 101962618 A | | 2/2011 |
| EP | 0630858 A2 | | 12/1994 |
| JP | S 5386689 A | | 7/1978 |
| JP | 07126399 A | | 5/1995 |
| JP | 08238484 A | | 9/1996 |
| JP | 2003117563 A | * | 4/2003 |
| JP | 2003117563 A | | 4/2003 |

(Continued)

OTHER PUBLICATIONS

USGS ("Water Quality in the Delaware River Basin", 2004, pp. 1-38, accessed online Apr. 29, 2016.*

(Continued)

*Primary Examiner* — Clare M Perrin
(74) *Attorney, Agent, or Firm* — Wegman, Hessler & Vanderburg

(57) ABSTRACT

A method for separating dispersed algae from an aqueous system is provided. The method includes adding to the aqueous system a polymer including tannin to form flocculated aggregates, and separating the flocculated aggregates from the aqueous system. A method for pretreating water comprising dispersed algae in an algae biofuel production system is also provided. The method includes adding to the water a polymer including tannin to form flocculated aggregates, and separating the flocculated aggregates from the water.

12 Claims, No Drawings

(56) References Cited

FOREIGN PATENT DOCUMENTS

| | | |
|---|---|---|
| JP | 2010503416 A | 2/2010 |
| JP | 2010513024 A | 4/2010 |
| JP | 2011529707 A | 12/2011 |
| WO | WO 2010/053826 A2 | 5/2010 |
| WO | 2010140037 A1 | 12/2010 |
| WO | 2011123970 A1 | 10/2011 |
| WO | WO 2011123970 A1 * 10/2011 ............ C02F 1/5272 |

OTHER PUBLICATIONS

Machine translation of Huang et al. (CN # 101602533A), pp. 1-5.*

Machine translation of JP-2003117563A, pp. 1-3. 2003.*

International Search Report from corresponding PCT Application No. PCT/US2012/057889, dated Jan. 28, 2013.

Pizzi., "Condensed Tannin for Adhesives", Ind. Eng. Chem. Prod. Res. Dev. vol. No. 21, Issue No. 3, pp. 359-369, Sep. 1982.

Ozacar et al., "Evaluation of Tannin Biopolymer as a Coagulant Aid for Coagulation of Colloidal Particles", Colloids and Surfaces A: Physicochemical and Engineering Aspects, vol. No. 229, Issues No. 1-3, pp. 85-96, Nov. 2003.

Tzoupanos et al., "Coagulation-Flocculation Processes in Water/Wastewater Treatment: The Application of New Generation of Chemical Reagents", 6th IASME/WSEAS International Conference on Heat Transfer, Thermal Engineering and Environment, pp. 309-317, Rhodes, Greece, Aug. 20-22, 2008.

Graham et al., "Characterisation and coagulation performance of a tannin-based cationic polymer: A preliminary assessment", Colloids and Surfaces A: Physicochemical and Engineering Aspects, vol. No. 327, Issue No. 1-3, pp. 9-16, Sep. 15, 2008.

Sanchez et al., "Surface water and wastewater treatment using a new tannin-based coagulant. Pilot plant trials", Journal of Environmental Management, vol. No. 91, Issue No. 10, pp. 2051-2058, Oct. 2010.

Nurseries, "Green Thumbs Guides", pp. 1-2, dated Jan. 27, 2012, retrieved from Internet archive https://web.archive.org/web/20120127204619/http://www.gardencentre.com/Information/GardeningTips/WaterGardeningInstallation/Algae/tabid/240/Default.aspx, on May 23, 2016.

Unofficial English Translation of Japanese Office Action issued in connection with corresponding JP Application No. 2014533388 dated Jun. 28, 2016.

Notice of Rejection, First Official Action and English Translation issued in Japanese Patent Application No. 2017-123804 dated Apr. 10, 2018.

* cited by examiner

METHOD FOR FLOCCULATING ALGAE USING POLYMERS INCLUDING TANNIN

BACKGROUND OF THE INVENTION

Field of the Invention

Embodiments of the present invention relate generally to water treatment and more particularly to flocculating algae in aqueous systems using polymers including tannin.

Description of Related Art

Water supplies for influent water treatment applications are often contaminated with a variety of contaminants, such as toxic chemicals, dissolved oil and various organic and inorganic particles of various sizes. Another common contaminant includes algae. Failure to remove algae from the water supply can cause problems in the operation of downstream utility and plant processes. For example, failure to remove algae prior to filtration leads to clogged filters, increased filter operation costs and wasted water required for frequent filter cleaning cycles.

In waste water treatment ponds and reservoirs, failure to remove algae from the bulk waste water can contribute to effluent total suspended solids (TSS), chemical oxygen demand (COD) and nutrient discharge concentrations. As each of these factors is commonly regulated by a predetermined discharge permit, failure to remove algae from waste water can result in violations of the discharge permits and possible fines.

Additionally, due to the high and escalating costs of fossil fuel based transportation fuels, the enormous world-wide demand for such fuels and the negative environmental impact of the wide-spread use of these fuels, there has been a significant market driven shift to the use of alternative fuels that are cleaner and renewable, namely biofuels. In algae biofuel production, inefficient separation of algae cells from bulk water results in lower solids concentrations of algae slurry to downstream harvesting and biofuel extraction processes. This inefficient separation of algae cells adversely affects the efficiency of the biofuel production processes.

Separating algae from water has been previously accomplished with traditional methods that employ aluminum sulfate. Because aluminum sulfate is a toxic chemical, its addition is detrimental to preserving the quality of precipitated algae.

Thus, there is a continuing need for an efficient method for separating dispersed algae from a water supply.

BRIEF SUMMARY OF THE INVENTION

In one embodiment of the present invention, a method for separating dispersed algae from an aqueous system is provided. The method includes adding to the aqueous system a polymer including tannin to form flocculated aggregates, and separating the flocculated aggregates from the aqueous system.

In another embodiment of the present invention, a method for pretreating water comprising dispersed algae in an algae biofuel production system is provided. The method includes adding to the water a polymer including tannin to form flocculated aggregates, and separating the flocculated aggregates from the water.

DETAILED DESCRIPTION OF THE INVENTION

Reference will now be made in detail to the various embodiments.

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

"Water soluble" means that the compound, such as polymer, block copolymer or monomer, that is described as water soluble is dissolvable in water or an aqueous solution. In one embodiment, the term "water soluble" means that the compound, block copolymer or monomer that is described is fully miscible in water or an aqueous solution.

"Water insoluble" means that the compound, such as polymer or monomer, that is described as water insoluble is not dissolvable or is poorly dissolvable in water or an aqueous solution.

Tannin, also called tannic acid, occurs in the leaf, branch, bark and fruit of many plants. As disclosed by A. Pizzi in "Condensed Tannin for Adhesives", Ind. Eng. Chem. Prod. Res. Dev. 1982, 21, pages 359-369, the natural tannins can be as "hydrolyzable" tannin and "condensed" tannin. The composition and structure of tannin will vary with the source and the method of extraction, but the empirical structure is given as $C_{76}H_{52}O_{46}$ with many OH groups attached to the aromatic rings. The tannin used in the embodiments of the present invention is a condensed tannin type including but not limited to those derived from Quebracho, *Mimosa* and Sumac. However, hydrolyzable tannins are also contemplated to be within the scope of the embodiments of the present invention.

Embodiments of the present invention relate to flocculating algae in aqueous systems using polymers including tannin. In particular, the polymers including tannin relates to a water soluble or dispersible polymer including tannin composition comprising a copolymer of a tannin and a cationic monomer. In another embodiment of the present invention, the water soluble or dispersible polymer including tannin composition comprises a polymer of tannin; a cationic monomer and at least one monomer selected from the group consisting of an anionic monomer and a nonionic monomer.

The cationic monomer may be selected from a group containing ethylenically unsaturated quaternary ammonium, phosphonium or sulfonium ions. Typical cationic monomers are quaternary ammonium salts of dialkylaminoalkyl(meth)acrylamides, dialkylaminoalkyl(meth)acrylates and diallyl dialkyl ammonium chloride.

In one embodiment, the cationic monomer is selected from the group include but are not limited to methyl chloride quaternary salt of diethylaminoethyl acrylate, dimethyl sulfate salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, diallyldimethyl ammonium chloride and diallyidiethyl ammonium chloride. In another embodiment, the cationic monomer is methyl chloride quaternary salt of diethylaminoethyl acrylate.

In one embodiment, the anionic monomer is selected from the group containing ethylenically unsaturated carboxylic acid or sulfonic acid functional groups. These monomers include but are not limited to acrylic acid, methacrylic acid, vinyl acetic acid, itaconic acid, maleic acid, allylacetic acid, styrene sulfonic acid, 2-acrylamido-2-methyl propane sulfonic acid (AMPS®) and 3-allyloxy-2-hydroxypropane sulfonic acids and salts thereof. In another embodiment, the anionic monomer is acrylic acid.

In one embodiment, the nonionic monomer is selected from the group of ethylenically unsaturated nonionic monomers which comprise but are not limited to acrylamide, methacrylamide, N-methylolacrylamide, N,N-dimethylacrylamide; lower alkyl ($C_1$-$C_6$) esters including vinyl acetate, methyl acrylate, ethyl acrylate, and methyl methacrylate; hydroxylated lower alkyl ($C_1$-$C_6$) esters including hydroxyethyl acrylate, hydroxypropyl acrylate and hydroxyethyl methacrylate; allyl glycidyl ether; and ethoxylated allyl ethers of polyethylene glycol, polypropylene glycol and propoxylated acrylates. In another embodiment, the nonionic monomers are allyl glycidyl ether and acrylamide.

The polymer including tannin may contain from 10 to 80% by weight of tannin, 20 to 90% by weight of cationic monomer, 0 to 30% by weight of nonionic monomer and 0 to 20% by weight of anionic monomer, provided that the resulting polymer including tannin is still water soluble or dispersible and the total weight % of cationic, nonionic and anionic monomers and tannin adds up to 100%. In embodiments where the cationic monomer and anionic monomer are present together in the polymer including tannin, the cationic monomer comprises a greater weight percentage than the anionic monomer.

In one embodiment, the copolymer of tannin and cationic monomer contains 20 to 80 weight % of tannin. In another embodiment, the copolymer contains from 30 to 60 weight % of tannin. In yet another embodiment, the copolymer contains from 30 to 50 weight % of the tannin, provided the total weight of tannin and cationic monomer totals 100 weight %. In still another embodiment, the copolymers have a weight % of 30% tannin and 70% cationic monomer and 50% tannin and 50% cationic monomer. In one embodiment, the copolymers include a tannin that is a *Mimosa* type tannin and the cationic monomer is methyl chloride quaternary salt of dimethylaminoethyl acrylate.

In one embodiment of the present invention, a method for separating dispersed algae from an aqueous system is provided. The method comprises adding to the aqueous system a polymer including tannin to form flocculated aggregates, and separating the flocculated aggregates from the aqueous system.

The method may also comprise mixing the aqueous system to promote contact between the polymer including tannin and the dispersed algae. The mixing may be continued for a predetermined period of time, or for a sufficient period of time to allow the dispersed algae and the polymer including tannin to form flocculated aggregates larger in size than the dispersed algae cells.

It has been recognized that the polymer including tannin contains numerous cationic functional groups when in an aqueous solution. The dispersed algae cells, which have a negative charge, form a strong complex with the polymer including tannin. This results in a large flocculated aggregate. Because the flocculated aggregate is large enough, separating the flocculated aggregate from the aqueous system may comprise performing filtration. Also, because the flocculated aggregate is heavy enough, separating the flocculated aggregate from the aqueous system may comprise performing gravity sedimentation.

According to an embodiment of the present invention a polymer including tannin may be included in an aqueous system at a concentration of from about 0 parts per million (ppm) relative to the aqueous system to about 100 ppm relative to the aqueous system, with an alternative range of from about 50 ppm relative to the aqueous system to about 100 ppm relative to the aqueous system.

The systems that can be treated by the method and formulations disclosed herein are vast and varied, and may be any known systems involving chemical treatment for removal of algae, particularly in aqueous based systems. In one embodiment the aqueous system may be a wastewater treatment system. In another embodiment, the aqueous system may be an algae biofuel production system.

Embodiments of the present invention will now be described with respect to certain examples that are merely representative. Each example is provided by way of explanation and is not meant as a limitation. For example, features illustrated or described as part of one embodiment can be used on or in conjunction with other embodiments to yield yet further embodiments. It is intended that the present disclosure includes such modifications and variations

EXAMPLES

Laboratory jar test studies were conducted to evaluate polymers including tannin for their ability to remove algae by flocculation and sedimentation. Tests were conducted using a pure culture of *chlorella pyrenoidosa*, a commonly occurring blue-green algae. To prepare the algae test substrate, a 60 ml sample of algae (*chlorella pyrenoidosa*) was obtained from the Carolina Biological Supply Co. in Burlington, N.C. This sample was diluted to 1 liter in 0.85% NaCl solution to provide sufficient quantity for use in jar test evaluations. The test substrate, as diluted, had the following properties:

pH=9.32 absorbance at 430 nm=0.530 (measured on Hach DR-2000 Spectrophotometer)

Turbidity=25 ntu (measured on Hach Model 18900 Ratio Turbidimeter)

Cell count=4,875,000 cells/ml (measured by D. Duvall of the Biocide Development Group)

The following procedure was used to determine the effect of various chemical treatments on algae removal by flocculation and settling:

1) For each chemical treatment evaluated, 80 ml of dilute algae culture was placed in a 100 ml beaker;
2) The algae culture was mixed at 30 rpm using a Phipps and Bird 6-place gang-stirrer equipped with 1.5 inch wide×0.75 inch high rectangular paddles;
3) While mixing at 30 rpm, chemical treatments were added to the algae culture as indicated in Table 1 below;
4) Each treated sample was mixed for 30 minutes at 30 rpm;
5) After the 30 minute mixing period, the mixing was stopped, the paddles were removed from the beakers and quiescent conditions were maintained for 20 minutes to allow flocculated algae to separate from the bulk solution by gravity sedimentation.
6) A sample of supernatant from each test beaker was obtained by decanting off the top of the beaker;
7) Each supernatant sample was analyzed for turbidity and absorbance at 430 nm using the analytical instruments described above.

Products Tested were:

Polymer A: a polymer including tannin comprising 50% tannin/50% acryloyloxyethyltrimethyl ammonium chloride (AETAC)

Polymer B: a polymer including tannin comprising 30% tannin/70% AETAC

TABLE 1

| Chemical Treatment | | Supernatant Water Quality | |
|---|---|---|---|
| Product Added | Dosage (ppm) | Turbidity (ntu) | Absorbance at 430 nm |
| None | 0 | 25 | 0.509 |
| Polymer A | 50 | 4.8 | 0.081 |
| Polymer A | 62.5 | 2.0 | 0.032 |
| Polymer A | 75 | 1.7 | 0.028 |
| Polymer A | 87.5 | 1.6 | 0.024 |
| Polymer A | 100 | 1.6 | 0.024 |
| Polymer B | 50 | 2.7 | 0.033 |
| Polymer B | 75 | 2.7 | 0.044 |

Results show that the polymers including tannin, Polymer A and Polymer B, were both effective for achieving excellent reductions in absorbance and turbidity. Because absorbance is directly proportional to the concentration of algae cells, the lower the absorbance, the lower the concentration of algae. Therefore, the results demonstrate that the polymers including tannin effectively reduced the algae concentration. For example, in one test, Polymer A reduced algae by approximately 95%.

This written description uses examples, including the best mode, to enable any person skilled in the art to make and use the described subject-matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for pretreating water comprising dispersed algae in an algae biofuel production system, the method comprising:
    adding to the water from about 50 ppm to about 100 ppm of a polymer including tannin;
    mixing the water at 30 rpm to promote complexing between the polymer including tannin and the dispersed algae within a plurality of dispersed algae cells to form flocculated aggregates for harvesting, wherein the polymer including tannin comprises a copolymer of tannin and a cationic monomer; and
    separating the flocculated aggregates from the water.

2. The method of claim 1, wherein the cationic monomer is selected from the group consisting of diallyldimethyl ammonium chloride, diallyldiethyl ammonium chloride, methyl chloride or dimethyl sulfate quaternary salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, and mixtures thereof.

3. The method of claim 1, wherein the polymer including tannin further comprises at least one monomer selected from the group consisting of an anionic monomer and a nonionic monomer, and mixtures thereof.

4. The method of claim 3, wherein the polymer including tannin further comprises a nonionic monomer, wherein the nonionic monomer is selected from the group consisting of acrylamide, methacrylamide, N-methylolacrylamide, N,N-dimethyl-acrylamide; vinyl acetate, methyl acrylate, ethyl acrylate, methyl methacrylate, hydroxyethyl acrylate, hydroxypropyl acrylate, hydroxyethyl methacrylate, allyl glycidyl ether, ethoxylated allyl ether of polyethylene glycol, and polypropylene glycol, and mixtures thereof.

5. The method of claim 3, wherein the polymer including tannin further comprises an anionic monomer, wherein the anionic monomer is selected from the group consisting of acrylic acid, methacrylic acid, vinyl acetic acid, itaconic acid, maleic acid, allylacetic acid, styrene sulfonic acid, 2-acrylamido-2-methyl propane sulfonic acid and 3-allyloxy-2-hydroxypropane sulfonic acid, and mixtures thereof.

6. The method of claim 1, wherein the weight percent of the tannin is from about 20% to about 80% and the weight percent of the cationic monomer is from about 80% to about 20% of the polymer including tannin.

7. The method of claim 1, wherein the weight percent of the tannin is from about 30% to about 50% and the weight percent of the cationic monomer is from about 70% to about 50% of the polymer including tannin.

8. The method of claim 1, wherein separating the flocculated aggregates from the water comprises performing filtration.

9. The method of claim 1, wherein separating the flocculated aggregates from the water comprises performing gravity sedimentation.

10. The method of claim 1, wherein said complexing reduces said dispersed algae by at least 95%.

11. A method for pretreating water comprising dispersed algae in an algae biofuel production system, the method comprising:
    adding to the water from about 50 ppm to about 100 ppm of a polymer including tannin, wherein said polymer including tannin comprises 50% tannin and 50% acryloyloxyethyltrimethyl ammonium chloride (AETAC);
    mixing the water to promote complexing between the polymer including tannin and the dispersed algae within a plurality of dispersed algae cells to form flocculated aggregates for harvesting, wherein said complexing reduces said dispersed algae by at least 95%; and
    separating the flocculated aggregates from the water, wherein said separating the flocculated aggregates from the water comprises performing filtration or gravity sedimentation.

12. A method for pretreating water comprising dispersed algae in an algae biofuel production system, the method comprising:
    adding to the water from about 50 ppm to about 100 ppm of a polymer including tannin, wherein said polymer including tannin comprises 30% tannin and 70% acryloyloxyethyltrimethyl ammonium chloride (AETAC);
    mixing the water to promote complexing between the polymer including tannin and the dispersed algae within a plurality of dispersed algae cells to form flocculated aggregates for harvesting, wherein said complexing reduces said dispersed algae by at least 95%; and separating the flocculated aggregates from the water, wherein said separating the flocculated aggregates from the water comprises performing filtration or gravity sedimentation.

* * * * *